United States Patent
Arlaban Gabeiras et al.

(10) Patent No.: US 11,703,035 B2
(45) Date of Patent: Jul. 18, 2023

(54) WIND TURBINE AND METHOD FOR ICE REMOVAL IN WIND TURBINES

(71) Applicant: ACCIONA WINDPOWER, S.A., Barásoain (ES)

(72) Inventors: Teresa Arlaban Gabeiras, Barásoain (ES); Marta Urien Zumeta, Barásoain (ES); Jose Luis Laborda Rubio, Barásoain (ES); Oscar Luquin Hermoso de Mendoza, Barásoain (ES); Carmen Azpillaga Alsaua, Barásoain (ES); Alberto Garcia Barace, Barásoain (ES); Alejandro Gonzalez Murua, Barásoain (ES); Jose Aristegui Lantero, Barásoain (ES); Jose Miguel Garcia Sayes, Barásoain (ES); Miguel Nunez Polo, Barásoain (ES)

(73) Assignee: Acciona Windpower, S.A., Sarriguren (ES)

( * ) Notice: Subject to any disclaimer, the term of this patent is extended or adjusted under 35 U.S.C. 154(b) by 306 days.

(21) Appl. No.: 16/987,935

(22) Filed: Aug. 7, 2020

(65) Prior Publication Data
US 2020/0370540 A1 Nov. 26, 2020

Related U.S. Application Data

(62) Division of application No. 15/354,064, filed on Nov. 17, 2016, now abandoned.

(30) Foreign Application Priority Data

Nov. 6, 2015 (EP) ..................... 15382548

(51) Int. Cl.
F03D 80/40 (2016.01)
F03D 17/00 (2016.01)
(Continued)

(52) U.S. Cl.
CPC ............... F03D 80/40 (2016.05); F03D 1/06 (2013.01); F03D 7/0224 (2013.01);
(Continued)

(58) Field of Classification Search
CPC ........ F03D 1/06; F03D 7/0224; F03D 7/0276; F03D 17/00; F03D 80/40; F05B 2270/325;
(Continued)

(56) References Cited

U.S. PATENT DOCUMENTS 8,292,579 B2 10/2012 Magnuson
8,348,609 B2 1/2013 Haraguchi
(Continued)

FOREIGN PATENT DOCUMENTS

CN 102003353 B 5/2012
EP 2626557 A1 8/2013
(Continued)

*Primary Examiner* — Richard A Edgar
(74) *Attorney, Agent, or Firm* — Lathrop GPM LLP; Ricardo Ochoa (57) ABSTRACT

A wind turbine is disclosed which comprises a control system configured to execute at least one ice removal routine which comprises a heating stage of at least one of the blades (3), and a mechanical removal ice stage. A wind turbine removing ice method is also disclosed which comprises a stage wherein the presence of ice is detected on at least one of the blades and, once said presence of ice is detected, comprises a stage wherein at least one ice removal routine is activated which comprises, in turn, a heating stage of at least one of the blades and a mechanical removing ice stage on at least said blade.

11 Claims, 5 Drawing Sheets

(51) Int. Cl.
*F03D 1/06* (2006.01)
*F03D 7/02* (2006.01)
*F03D 7/04* (2006.01)

(52) U.S. Cl.
CPC .......... *F03D 7/0276* (2013.01); *F03D 7/047* (2013.01); *F03D 17/00* (2016.05); *F05B 2260/80* (2013.01); *F05B 2270/32* (2013.01); *F05B 2270/325* (2013.01); *F05B 2270/404* (2013.01); *F05B 2270/70* (2013.01); *F05B 2270/80* (2013.01); *Y02E 10/72* (2013.01)

(58) Field of Classification Search
CPC ............ F05B 2270/32; F05B 2270/404; F05B 2260/80; F05B 2270/80; Y02E 10/72
See application file for complete search history.

(56) References Cited

U.S. PATENT DOCUMENTS

| | | |
|---|---|---|
| 2010/0119370 A1 | 5/2010 | Myhr |
| 2010/0189560 A1 | 7/2010 | Haraguchi et al. |
| 2011/0042950 A1* | 2/2011 | Mizoue .................. F03D 80/40 290/44 |
| 2013/0177416 A1* | 7/2013 | Renschler ............... F03D 80/40 416/1 |
| 2013/0195657 A1 | 8/2013 | Lauritsen et al. |
| 2015/0023792 A1 | 1/2015 | Spitzner et al. |

FOREIGN PATENT DOCUMENTS

| | | |
|---|---|---|
| FR | 2972231 A3 | 9/2012 |
| GB | 2481416 A2 | 12/2011 |

* cited by examiner

WIND TURBINE AND METHOD FOR ICE REMOVAL IN WIND TURBINES

CROSS REFERENCE TO RELATED APPLICATIONS

This application is a divisional of Ser. No. 15/354,064 filed on Nov. 17, 2016, which claims priority to European Application No. 15382548.4 filed on Nov. 6, 2015, the contents of which are hereby incorporated by reference in their entirety.

OBJECT OF THE INVENTION

The present invention belongs to the field of energy generation by means of wind turbines. In particular, the present invention relates to a wind turbine having the capacity of removing ice deposited on its blades and a removing ice deposited in the wind turbine blades method.

BACKGROUND OF THE INVENTION

The deposition of ice or other type of unwanted material on the wind turbine blades causes inadequate operation in terms of production and loads. This is due to the variation in the aerodynamic and mass characteristics of the blades, partly due to the modification of the geometry of the aerodynamic profiles. This variation in aerodynamic profiles can even cause aerodynamic loss in certain parts of the blade. Said variation can result in an increase in wind turbine loads and vibrations.

The prior art proposes different solutions to try to solve the previously described problem.

Therefore, there are systems for removing and/or preventing ice formation based on the heating of at least part of the outer surface of the blades. In the first case, the system is brought into operation upon detecting ice formation with the aim of removing it as quickly as possible; said systems are known as de-icing systems. In the second case, the heating system is brought into operation prior to ice formation when conditions given to ice formation are detected. Energy consumption in both types of systems can be considerable and it is important to reduce required heating time to a maximum.

However, other active systems are based on ice removal in an exclusively mechanical manner. Thus, there are systems that pursue the removal of ice by deforming the outer blade surface, such as that disclosed in GB2481416. This document proposes adding elements that deform at least the outer blade surface, such as an element that produces a vibration in the interior thereof. The main drawback of said system is that it requires the inclusion of technically complex elements and an adaptation of the structural blade design (or at least verification of its adequacy) for integration thereof.

Others only use systems usually present in wind turbines, such as the blade pitch or the rotor speed control system. Thus, in the method disclosed in U.S. Pat. No. 8,292,579B2, vibrations are induced in the blades by controlling wind turbine torque. However, said control method for ice removal is only effective with low-density ice.

DESCRIPTION OF THE INVENTION

The present invention discloses a wind turbine that solves the problems of the prior art allowing the removal of ice from the blades with less energy consumption than the devices of the prior art. Also, it does not require substantial modifications in the structural design of the blades.

Specifically, the present invention discloses a wind turbine of the type comprising:
  a rotor having at least two blades;
  a control system;
  means for detecting the presence of ice on the blades;
  a heating system having at least one heating element configured to carry out a heating stage of at least one of the blades.

Preferably, the heating system is connected to the control system and is configured to carry out a heating stage of at least one of the blades by activating the power supply of at least one heating element disposed in each of the blades. To this purpose, the control system comprises at least one ice removal routine that comprises the following stages:
  a heating stage of at least one of the blades;
  an induction movement stage on at least one of the blades, also called mechanical ice removal stage.

Preferably, the heating stage, wherein at least one of the blades is heated, is executed first. The mechanical ice removal stage on at least said blade is carried out when the heating stage has been carried out at least partially.

In addition, the mechanical ice removal stage can also be carried out, at least partially, simultaneously with the heating stage (having heated the blade for a certain time, after which the mechanical ice removal stage is carried out while continuing to heat the blade).

Executing firstly the heating stage for a sufficient time facilitates faster ice removal because the heating stage reduces the adherence of the ice to the blade (although it does not eliminate it fully) since it contributes to the thawing of part of the ice surface. After the heating stage has been carried out for at least a certain time, the mechanical ice removal stage is carried out, which accelerates the removal of the ice that could remain adhered to the outer blade surface after the heating stage.

In one embodiment, the ice removal routine includes a heating stage having a predetermined duration, after which the mechanical ice removal stage is carried out.

Likewise, the routine can comprise sequences wherein the blade heating stages are alternated with mechanical ice removal stages on said blades, wherein the duration of each of said stages can be predetermined.

The mechanical ice removal stage requires the execution of a movement (or sequence of movements) in at least one blade. Thus, the mechanical ice removal stage comprises at least one of the following substages:
  execution of a blade movement by adjusting blade pitch angle,
  execution of a blade movement by adjusting rotor rotation speed.

To this purpose, the wind turbine control system sends the corresponding rotor rotation or blade pitch adjustment orders.

In one embodiment, the blade pitch angle is modified by means of controlled acceleration and deceleration.

In one embodiment, the mechanical ice removal stage is carried out with the wind turbine stopped and the adjustment in rotor rotation speed comprises performing a wind turbine rotor starting sequence such that the rotor starts rotating.

The heating stage of at least one of the blades comprises the activation of the heating system. In an embodiment described below the heating system is aerothermal. In other embodiments, the heating system can be based on thermo-resistant fabrics embedded in the blade material and near the outer blade surface or disposed on the outer surface thereof.

In both cases, it energetically compensates to include the mechanical ice removal stage in the ice removal routine. However, when used in aerothermal systems it is more advantageous for the ice removal routine to include a mechanical ice removal stage, as said heating systems are less efficient than systems based on thermo-resistant materials (due to the fact that the heat must flow outwards through the blade shells, which are usually made of a compound material and which in certain zones are very thick). The invention therefore makes it possible to reduce the time required to remove the ice with respect to the use of a single heating stage.

Thus, the wind turbine preferably comprises an aerothermal heating system that comprises, in the zone next to the blade root, a fan for impelling air through a duct that comprises the heating element, comprising, in one embodiment, electrical resistors that transfer heat to the air in the interior of the blade. Said air is conducted through the interior of the blade towards the blade zone where the ice must be removed, typically located between half the blade length and the tip of the blade in the leading edge zone.

In one embodiment, the interior of the wind turbine blade comprises a first chamber formed from a part of the blade shell that includes the blade leading edge and at least one spar thereof. In said first chamber, a duct is disposed for conducting the hot air that extends from the root to a point disposed at a distance from the root between ⅓ and ⅔ of the length of the blade wherein the air is released inside the first chamber and will flow towards the tip zone. When the air reaches the tip, it returns towards the tip zone through a second chamber disposed between the spar and the trailing edge of the blade or between two spars.

In one embodiment of the invention, a temperature sensor is disposed at the exit of the duct that comprises the electrical resistors for monitoring the air temperature at the exit of the aerothermal system. According to this embodiment, the control system controls the feeding of the resistors in accordance with the magnitude of the difference between the temperature measurement at the exit of the aerothermal system and a reference temperature.

Said reference temperature, in one embodiment, is calculated in accordance with the maximum temperature that can be supported by the blade material, thereby preventing any type of damage.

In one embodiment, the control of the feeding of the resistors is of the on-off type. In one embodiment, the control system has implemented a hysteretic control loop for controlling the aerothermal system output air temperature such as to ensure that its temperature does not exceed the reference temperature by more than a predetermined margin. Once said temperature is exceeded, at least part of the resistors of the heating system are disconnected so that the air does not exceed said temperature. Furthermore, when the aerothermal output temperature falls below the reference temperature within a certain margin (which may be different to the foregoing), at least part of the resistors are reconnected to the power supply. Depending on the switching system of the resistors, the control can be more or less continuous and implement a P1-type control loop or similar.

The reference temperature may vary slightly depending on the weather conditions. Thus, under certain conditions, there is margin for increasing the reference air temperature while always maintaining the maximum temperature that can be supported by the blade material, or reduce it so as not to exceed said maximum temperature in order to increase the effectiveness of the heating system.

The wind turbine comprises means for detecting the presence of ice on the blades. Said means may comprise, inter alia:
- a comparing algorithm for comparing between a signal indicative of the power generated and a signal indicative of the power expected at the wind speed measured (or incoherence between the wind speed and power signals measured);
- equipment for estimating the natural frequency to each blade based on accelerometers and comparison measurements with respect to the inherent frequency without ice;
- ultrasound or capacitive ice detection sensors disposed in the interior of the blade;
- an algorithm for estimating the presence of ice and thickness thereof based on the measurement of temperatures in the interior of the blade.

In order to implement said algorithm, the blade is equipped with temperature sensors in at least one zone where the ice must be removed. In one embodiment, the temperature sensors are disposed in a blade control station, disposed at a point situated at a distance from the blade root between 60% and 90% of the blade length. This is where the greatest quantity of ice is deposited and whereon action must be done. Preferably, at a point placed between 75% and 90% of the blade length.

Preferably, at said control station at least one temperature sensor is disposed on the inner wall of the blade in a zone of the leading edge, i.e. disposed in contact with the wall of the leading edge. This sensor makes it possible to determine a temperature value $T_1$ in the interior of the blade on the leading edge. Additionally, two more sensors are disposed in said control station: an internal air temperature sensor, based on which a temperature value in the interior of the blade $T_{ia}$ is obtained, and a temperature sensor of the blade wall, in a zone where ice is not usually deposited, wherewith a temperature value of the blade wall in an ice-free zone $T_2$ is obtained. This sensor arrangement makes it possible to perform the corresponding calculations to determine the presence of ice and, where applicable, the thickness of the ice layer.

In order to calculate the thickness of the ice layer and the temperature on the blade surface, the three previously described sensors (which provide the values $T_1$, $T_2$ and $T_{ia}$), which are disposed in the control station in the interior of the blade, are used.

An algorithm for estimating the presence of ice on the blades and quantifying the thickness thereof, and which is included in the wind turbine control routine, is used. Said algorithm uses a mathematical programming based on the electrical similarity of the thermal problem of heat transmission that uses at least the following parameters:
- Conduction resistance ($R_{cond}$) through the blade walls. At least the blade control station is characterized to determine the thermal resistance values $R_{cond}$ each zone of said station, as there can be different values of $R_{cond}$ in each zone, as both the materials used (and therefore their thermal conductivity) and thickness vary from one zone to another. In one embodiment, the thermal resistance values $R_{cond}$ are determined in points 1 and 2, $R_{condK1}$ and $R_{condK2}$, where sensors for measuring inner blade surface temperature are disposed.
- Internal convection resistance ($R_{cond}$). This value is considered known (characterized on the basis of a finite element calculation model, such as for example a CFD (computational fluid dynamics) model having identical value in points 1 and 2, where the inner blade surface temperatures $T_1$ and $T_2$ are measured).

The following variables are calculated based on said parameters and the $T_1$, $T_2$ and $T_{ia}$ values:

Calculation of the heat flows through the outer blade surface in points 1 and 2 (variables q1 and q2), which are calculated based on the gradient between the air temperature in the interior of the blade and the inner blade surface temperature measured in said points 1 and 2 of the blade control station ($T_1-T_{ia}$ and $T_2-T_{ia}$ respectively).

Calculation of external convection resistance ($R_{conve}$). This value is calculated based on the thermal gradient between the temperature of the air in the interior of the blade ($T_{ia}$) and the ambient temperature ($T_{ea}$), and on the value calculated previously for q2. It is assumed to be the same for both points of the blade profile in points 1 and 2 of the blade control station.

Calculation of the thermal resistance of the ice on the leading edge based on the thermal gradient between the temperature of the air inside the blade and the ambient temperature, and on values calculated for q1 and $R_{conve}$.

Calculation of the temperature on the outer blade surface on the leading edge of the blade based on the previous values.

The calculation of the variables q1 and q2 is performed by means of the following mathematical formulas based on the values of the foregoing predetermined parameters ($R_{condK1}$, $R_{condK2}$ y $R_{convi}$) and on the temperature measurements $T_1$, $T_2$ and $T_{ia}$:

$$q1 = \frac{Tai - T1}{Rconvi} = \frac{Tai - Tae}{Rconvi + RcondK1 + Rhielo + Rconve}$$

$$q2 = \frac{Tai - T2}{Rconvi} = \frac{Tai - Tae}{Rconvi + RcondK2 + Rconve}$$

Once the value of the heat flow towards the exterior has been calculated in point 2 (q2), the value of the term of thermal external convection resistance, $R_{conve}$ is calculated. Lastly, based on the previously calculated value of q1 and using the value of the term of thermal external convection resistance, $R_{conve}$, the thermal resistance value provided by the ice, $R_{ice}$, in point 1 of the blade control station is calculated.

Afterwards, the thickness of the ice layer is calculated considering the additional thermal resistance in the iced surface as a consequence of the ice and considering the conductivity of the ice:

$$e = Rice * Kice$$

In order to obtain a signal indicative of the presence of ice, a measurement indicative of the average power consumed can alternatively be used. The value of the average power consumed can be obtained in two ways:

Indirectly: By calculating the difference in temperature between the air at the inlet/outlet of the aero heater (after having passed through the interior of the blade). As ice increases thermal resistance, the transmission of heat to the exterior for the same thermal gradient (between the internal air temperature and external air temperature) and external wind speed conditions is reduced. In this manner the average power consumed to maintain a reference air temperature is reduced.

Directly: By measuring the average power consumed.

Furthermore, the present invention also discloses a wind turbine removing ice method, the wind turbine of the type comprising:
a rotor having at least two blades;
a wind turbine control system; and
means for detecting the presence of ice on the blades;
a heating system having at least one heater element connected to the control system and configured to carry out a heating stage of at least one of the blades, said method comprising the following stage:
detection of the presence of ice on at least one of the blades;
and being characterized in that, upon detecting the presence of ice, it comprises activating at least one ice removal routine comprising, in turn, the following stages:
a heating stage of at least one of the blades;
a mechanical ice removal stage on at least said blade.

The heating stage of at least one of the blades comprises the activation of at least one heating element.

The mechanical ice removal stage is carried out when the heating stage has been carried out at least partially. In particular, a minimum duration of the heating stage prior to the activation of the mechanical ice removal stage is established on at least one of the blades.

Preferably, the minimum duration of the heating stage is a predetermined time. However, in particular embodiments of the present invention, said minimum duration of the heating stage can be calculated by the control system in accordance with the amount of ice detected and/or the weather conditions.

In addition, the present invention envisages that, in a preferred embodiment, the heating stages and mechanical ice removal stages of at least one of the blades are carried out simultaneously in at least part of their duration. Therefore, once the heating element has been left turned on for a certain time, the mechanical ice removal stage is started in at least one of the blades such that, at least for a certain period of time, both stages occur simultaneously. However, in other embodiments of the present invention, the mechanical ice removal stage on at least one of the blades is carried out upon completing the heating stage.

Since, preferably, this method is iterative until the ice is removed from the blade, after carrying out the mechanical ice removal stage on at least one of the blades, the method can be executed again until determining the non-presence of ice during the stage wherein the presence of ice is detected in at least one of the blades or the substantial reduction of ice on the blade or wind conditions which allow wind turbine operation to be resumed to generate power despite the presence of ice.

Likewise, the routine may comprise sequences wherein blade heating stages are alternated with movement induction stages in said blades, wherein the duration of each stage is predetermined.

The mechanical ice removal stage comprises the execution of a movement (or sequence of movements) in at least one blade and is executed by means of at least one of the following two types of orders sent by the control system:
wind turbine rotor rotation orders, which can in turn comprise braking and rotor acceleration orders, or
blade pitch angle adjustment orders through the actuation of the blade pitch adjustment system.

In this regard, the blade pitch angle adjustment movement may comprise a sequence of movements of the blade pitch system, between blade positions preferably in a range between 90° and 30°.

The initial minimum duration of the heating cycle after which the mechanical ice removal stage is executed in at least one blade is calculated in accordance with the ambient temperature. Alternatively, it may be carried out for a predetermined minimum time.

In addition, wind speed and/or ice layer thickness are also taken into account to determine the minimum initial duration of the heating cycle. Said calculation can be performed, for example, by means of a table wherein the duration of the cycle is specified in accordance with environmental parameters (temperature, wind speed and/or ice layer thickness), wherein the specified duration has been obtained from field experiments or through simulations.

Preferably, the duration of the heating cycle is progressively reduced in the subsequent heating cycles.

Preferably, the heating cycle keep running during the blade movement execution stage.

The mechanical ice removal stage is performed for a predetermined time after which it is verified that the ice has been removed or has been substantially reduced and, if it has not yet been removed, one of the following actions is carried out:

a new heating cycle is initiated, or the heating cycle continues but without executing the blade movement.

If, after the blade movement, the presence of ice on the blades is still detected, various heating cycles are alternated with various movement cycles. The detection of the presence of ice on the blades can be carried out by initiating a wind turbine starting sequence verifying, for example, rotor acceleration and comparing it with acceleration under ice-free conditions.

In one embodiment, executing a blade movement implies modifying the blade angle by means of controlled acceleration and deceleration by actuating the blade pitch system in accordance with the blade pitch angle adjustment orders sent by the control system. The acceleration and deceleration are preferably high to induce vibrations in the blade, thereby contributing to the breakup and/or detachment of the ice layer.

In one embodiment, executing a rotor rotation movement comprises performing a wind turbine rotor starting sequence, such that the rotor starts rotating after the heating stage in accordance with the wind turbine rotor rotation orders sent by the control system. This implies that the heating stage was carried out with the rotor stopped, an unnecessary aspect according to the invention.

The blade pitch angle movements are performed with the machine stopped, such that the pieces of ice which are detached from the blades fall in the vicinity of the wind turbine and are not projected far from it due to the rotation of the rotor. To this end, the blade pitch angle movements are preferably performed between blade pitch angle positions which allow the rotor to remain stopped (for example, between pitch positions of 90° and 30°) and leaving at least one of the blades feathered (90°).

Likewise, the method can additionally comprise a stage wherein the blade is positioned in a predefined azimuth angle and which is carried out prior to the stage of executing a blade movement modifying blade pitch by means of controlled acceleration and deceleration. In one embodiment, in said stage the blade is disposed in a position oriented substantially downwards. In another embodiment, in said stage a blade is disposed in a position oriented substantially towards one side.

In one example of embodiment, the controlled acceleration and deceleration is repeated continuously.

The method additionally comprises a stage wherein the presence of ice is detected on said blade before generating the controlled acceleration and deceleration. In one embodiment of the method, said controlled acceleration and deceleration is carried out by actuating one or more actuators of the wind turbine.

The wind turbine of the present invention may comprise at least one sensor for detecting the presence of ice in at least one of the blades, may comprise an azimuth angle detector for detecting the azimuth angle of at least one blade that is going to be subjected to the heating stage and to the mechanical ice removal stage and may comprise a rotor actuator for controlling the azimuth position of the blade during said stages.

In one embodiment, the activation of the blade heating routine is carried out with the wind turbine stopped.

In addition, in order to improve the safety of the procedure, the method of the present invention comprises a stage wherein at least one of said blades is disposed in an azimuth angle predetermined prior to carrying out the staged).

Said predetermined azimuth angle may be such that the blade substantially points downwards (180°) or towards one side (270°) before carrying out staged).

Another object of the invention is a wind turbine control method comprising a blade heating system. Said method comprises a stage wherein the effectiveness of the heating system is estimated (for ice removal, i.e. de-icing or preventing the appearance of ice, i.e. anti-icing mode, as applicable) in accordance with one of the environmental conditions measured or estimated prior to activating the blade heating system.

Therefore, the stage wherein the effectiveness of the heating system is estimated according to the method includes carrying out the following substages:

a stage wherein certain wind speed and temperature conditions envisaged for the heating cycle are determined;

a stage wherein the wind speed and temperature conditions envisaged for the heating cycle are compared with respect to wind speed and temperature conditions whereunder the heating system is effective.

If the stage wherein the effectiveness of the heating system is estimated results that the heating system is effective for the purposes pursued, the method comprises carrying out a heating system activation stage.

Through the heating system effectiveness estimation stage, the possibility of removing or preventing ice under turbine operating conditions in order to decide whether or not the blade heating routine is activated. The activation of the blade heating system will only take place if the heating can be effective for the purpose pursued (preventing the formation of ice or removing it after adhering to the blade). This makes it possible to avoid ineffective power consumption by the heating system components.

The environmental conditions whereunder the system is effective (for both modes, i.e. as anti-icing or as de-icing) depend on whether or not the wind turbine is operating. Thus, for example, if the environmental conditions whereunder the system is effective are represented in a table or graph or in any other way, the control algorithm includes a table or graph in its program for de-icing or anti-icing operation. The fact that the wind turbine is operating implies a rotor rotation speed which makes the apparent wind speed in the blades seem much greater than the free wind speed, reducing the effectiveness of the heating system.

Said method also comprises a stage wherein the presence of ice or conditions given to the formation of ice on the blades such that, if said conditions are detected, the heating system effectiveness estimation stage is carried out. Weather conditions given to the formation of ice on the blades, i.e. that can influence the formation of ice on the blades, include, for example, humidity or the percentage of water in the air, wind speed, temperature, etc. Preferably, the weather conditions considered in this case are humidity and ambient temperature.

Thus, for the heating system to operate in anti-icing mode, the heating system effectiveness stage according to the method includes carrying out the following stages:
 a stage wherein the wind speed and temperature conditions envisaged for the heating cycle are determined;
 a stage wherein the envisaged wind speed and temperature conditions are compared with wind speed and temperature conditions whereunder ice formation can be prevented;
 a heating system activation stage if the comparison between wind speed and temperature conditions envisaged for the heating system with respect to the wind speed and temperature conditions whereunder the formation of ice can be prevented conclude that the heating system is effective.

In one embodiment, the conditions whereunder the formation of ice can be prevented are predetermined, having evaluated under simulation the temperature and/or wind speed conditions whereunder the heating system can prevent the formation of ice depending on whether or not the wind turbine is in operation.

Thus, the method comprises a wind turbine status verification stage and a stage wherein wind speed and temperature conditions whereunder the formation of ice can be prevented in accordance with wind turbine status are determined.

In the event that the presence of ice has not yet been detected but the conditions are given to its formation and the effectiveness of the heating system in preventing the formation of ice has been positively valued, it will be activated in anti-icing mode.

However, if after carrying out a stage wherein the effectiveness of the heating system as an anti-icing system is estimated, it is demonstrated that for the turbine operation status, given the weather conditions envisaged for the heating cycle (conditions estimated for the next instants in which the heating system will be potentially activated) the heating system is not effective (for example, with a lower envisaged ambient temperature for the envisaged wind conditions than that which would allow an outer blade surface temperature higher than a threshold, for example, higher than −2° C.), it is decided that the heating system will not activated in anti-icing mode. In this example, the wind turbine would continue its normal operation until the formation of ice is detected, in which case the effectiveness of the heating system would be newly evaluated, in this case as an anti-icing system.

In this case, if the heating system cannot be effective as an anti-icing system and if the conditions given to the formation of ice persist, ice will accumulate on the blade surface. Once this occurs and the wind turbine control system detects ice, a stage wherein the effectiveness of the heating system for operation in de-icing mode is estimated will be carried out, i.e. it will evaluate the activation of the heating system for operation in de-icing mode.

Thus, the state wherein the effectiveness of the heating system is estimated according to the method includes, for operation in de-icing mode, carrying out the following stages:
 a stage wherein wind speed and temperature conditions whereunder ice can be removed are determined;
 a stage wherein the wind speed and temperature conditions envisaged for the heating cycle are determined;
 a stage wherein the wind speed and temperature conditions envisaged for the heating cycle are compared with the wind speed and temperature conditions whereunder ice can be eliminated;
 a stage wherein the heating system is activated if the comparison between the wind speed and temperature conditions with respect to the wind speed and temperature conditions whereunder it can be removed, indicate that the heating system would be effective.

The stage wherein the wind speed and temperature conditions envisaged for the heating cycle (i.e. for the next instants in which the heating cycle will be potentially executed) are determined, either as an anti-icing or de-icing system, comprises one of the following methods for obtaining said conditions:
 measurement of current wind speed and ambient temperature and assumption that the wind speed and temperature conditions in the next instants will be similar to the current conditions;
 measurement of current wind speed and temperature, and estimation of the wind speed and temperature values envisaged for the next instants based on wind speed and temperature trends observed in the previous instants (past hours, days, etc.);
 receipt of predictions on the wind speed and temperature envisaged for the next instants, for example, from a remote control center of the wind farm or from a weather station.

Thus, the wind speed and temperature conditions of the next instants may be estimates based on the measurements of said variables made in previous instants such as, for example, based on the calculation of the average for the previous 10 minutes, previous 20 minutes, previous 60 minutes, etc. This estimation can be corrected applying trends of previous days in the same time zone or using wind predictions received remotely.

The wind and temperature conditions whereunder the system will be effective depend, to a certain extent, on the thickness of the ice layer. Thus, in one example of embodiment, the method comprises previously carrying out an ice layer quantification stage to increase the effectiveness of the method for decreasing consumption.

In this case, the method includes:
 a stage wherein the ice layer is quantified,
 a stage wherein the wind speed and temperature conditions whereunder the ice can be removed in accordance with its thickness are determined.

In this manner, in accordance with the result of the comparison stage of the wind speed and temperature conditions envisaged for the heating cycle with respect to the conditions determined in accordance with the thickness of wind speed and temperature in which ice can be removed, the heating system will or will not be activated in the heating system activation stage.

As of a high ice layer thickness threshold (or power losses) and if the system is not capable of removing the ice with the wind turbine in operation, the wind turbine rotor is stopped to activate the heating system. This is so because if the rotor is rotating, the relative speed of the air that surrounds the blade is much higher and this reduces heating effectiveness. Above this threshold, if the system is effective, the system is activated with the wind turbine in operation, i.e. with the rotor rotating.

In one embodiment, the wind turbine control system has different curves (or tables) implemented in its algorithm, wherein wind speed conditions are defined with respect to the temperature in which the heating system is effective. Said curves are different depending on whether the wind turbine is in operation or stopped and depending on ice layer thickness, using the wind speed and temperature conditions envisaged for the heating cycle with respect to the wind speed and temperature conditions whereunder the system is effective, in order to determine whether or not the heating system will be effective.

DESCRIPTION OF THE DRAWINGS

In order to complement the description being made and with the object of helping to better understand the characteristics of the invention, in accordance with a preferred embodiment thereof, said description is accompanied, as an integral part thereof, by a set of drawings where, in an illustrative and non-limiting manner, the following has been represented.

PREFERRED EMBODIMENT OF THE INVENTION

Following is a description, with the help of FIGS. 1 to 5, of embodiments of the present invention.

As described previously, one of the problems of wind turbines is that, under certain weather conditions, they tend to generate ice masses on the blades (3). In order to remove the ice already deposited on the blades (3), the present invention envisages a wind turbine with capacity to remove ice from the blades and a method for removing ice from wind turbines.

Figure 1:
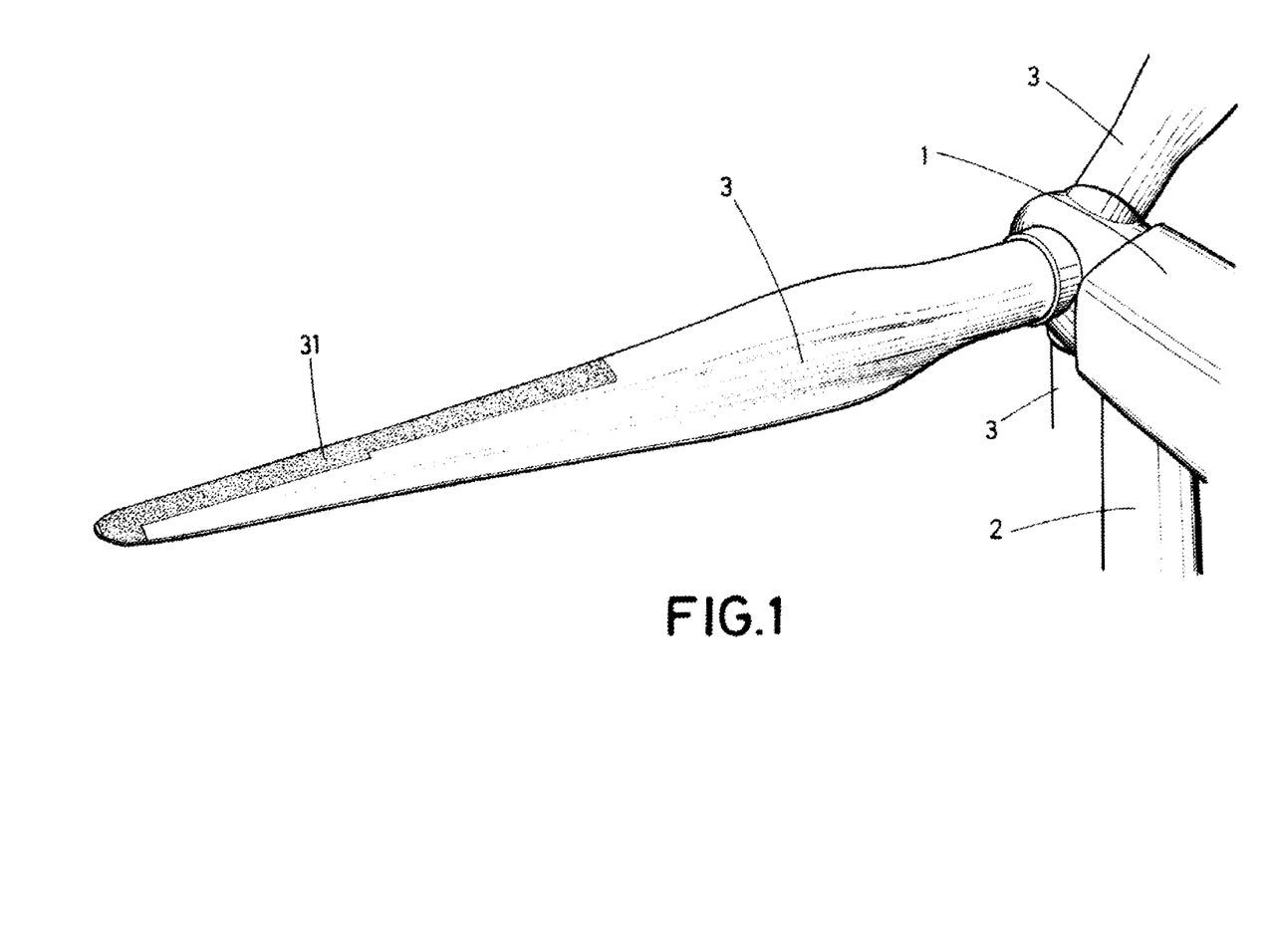
FIG. 1 shows a perspective view of a wind turbine of the type of the present invention.

FIG. 1 shows an example of a wind turbine of the type used in the present invention. Specifically, this wind turbine comprises a rotor having at least two blades (3), a control system, means for detecting the presence of ice on the blades and a heating system having at least one heating element (31) configured to carry out a heating stage wherein at least one of the blades is heated.

The control system comprises at least one ice removal routine that comprises the following stages:
  a heating stage of at least one of the blades (3);
  an inducing movement stage on at least one of the blades, hereinafter referred to as mechanical ice removal stage.

The rotor comprises at least one hub whereto the blades (3) are joined by means of bearings which allow the adjustment of the blade pitch angle by means of actuators.

Preferably, the heating stage of at least one of the blades (3) is partially carried out prior to the mechanical ice removal stage, and at least for a certain time. Once said time has elapsed, the mechanical ice removal stage is carried out, contributing to the removal of the traces of ice that give rise to vibrations in the blade (3). By inducing a movement in the blade (3), the ice is fractured perpendicularly to the blade profile surface and ice becomes detached from the critical zone wherein at least part of the ice mass nearest the heated surface has melted or softened.

Figure 2:
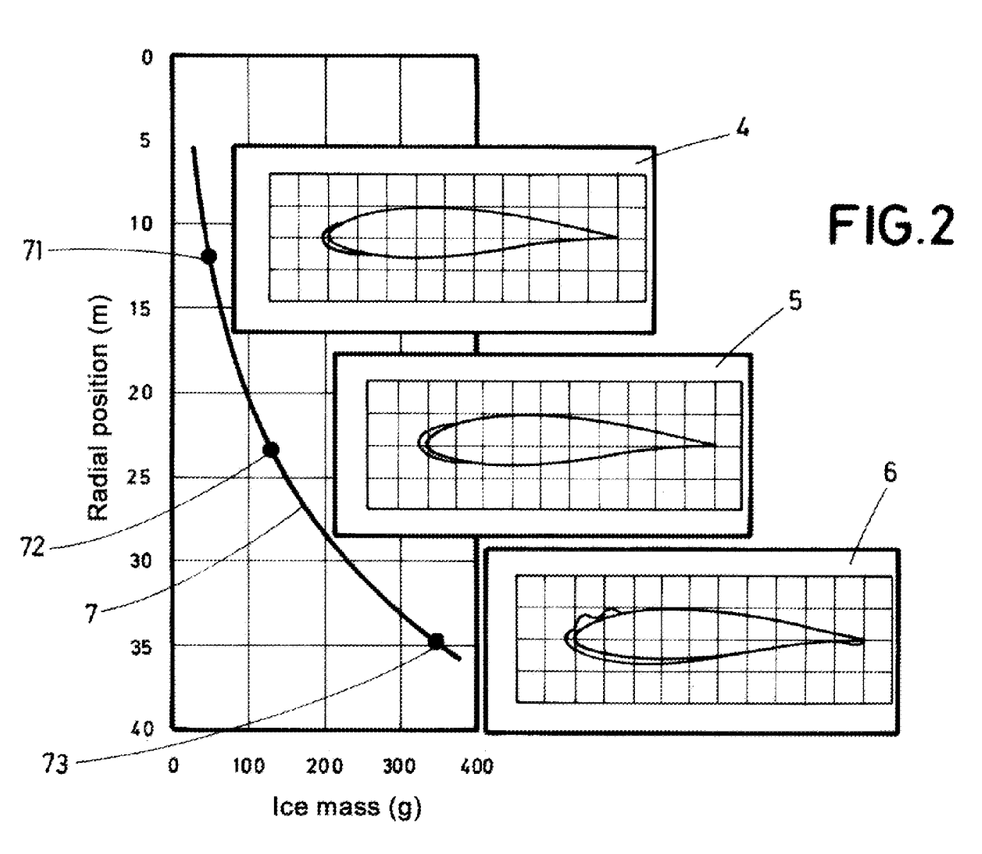
FIG. 2 shows a graph wherein the ice mass generated on a blade in different radial positions is determined.

As shown in FIG. 2, there are certain zones on the blades (3) that are more susceptible to the generation and/or accumulation of ice. It is convenient to conduct the heat generated by the heating element (31) of the heating system to these zones. The heating element may be, for example, heating resistors or any heating means known in the state of the art.

FIG. 1 shows a critical zone wherein the convenience of disposing a heating element (31) has been determined. This critical zone is the distal zone of the blade (3), as it has been concluded that more ice is deposited on zones having a higher relative wind speed.

However, thermal resistance throughout the blade (3) surface varies depending mainly on the thickness of the shells and of the materials used in the manufacture thereof, due to which there are zones wherein the ice layer in contact therewith melts and zones of the same profile wherein it continues frozen. The presence of said still frozen zones prevents the ice from becoming detached, despite the existence of other zones wherein the layer in contact with the blade has melted.

The mechanical ice removal stage can be carried out by two types of orders sent by the control system:
  wind turbine rotor rotation adjustment orders sent by the control system, which can be rotor acceleration and braking orders,
  blade pitch adjustment orders sent by the control system.

The wind turbine comprises means for detecting the presence of ice on its blades, which are selected from among:
  an algorithm of comparison between a signal indicative of the power generated and a signal indicative of the power expected at the wind speed measured (or of incoherence between the wind speed and power signals measured),
  equipments for estimating the natural frequency to each blade (3) based on accelerometers measurements and comparisons with respect to inherent frequency without ice,
  ultrasound or capacitive ice detection sensors disposed in the interior of the blade (3) or, for example, an infrared sensor for detecting the presence of a mass on the distal part of the blade (3),
  an algorithm for estimating the presence of ice and thickness thereof,
  means of comparison between a predetermined power consumed and an average power consumed by the heating system.

In another embodiment, the detection of the presence of ice by means of a wind turbine starting sequence wherein the acceleration achieved is compared with the current status of the blades (3) with a reference acceleration taken with the blades in normal conditions (due to the effect of the presence of ice on the rotor blades, it has less aerodynamic efficiency and acceleration will be lower).

In one embodiment of the invention, the wind turbine comprises the following sensors in the control station:
  an inner blade wall temperature sensor in a zone of the leading edge to determine a temperature value (T1) in the interior of the blade on the leading edge;

an internal air temperature sensor to determine a temperature value ($T_{ia}$) in the interior of the blade; and a blade wall temperature sensor in a zone where ice is not usually deposited in order to determine a temperature value (T2) on the blade wall in an ice-free zone.

In the embodiment wherein, the presence of ice is detected by means of an algorithm for estimating the presence of ice on the blades, said algorithm uses a mathematical program based on the electrical similarity of the thermal problem of heat transmission that uses at least the following parameters:

Conduction resistance ($R_{cond}$) through the blade walls. It is calculated in the points in which the previously described sensors are disposed (points 1 and 2 shown in FIG. 3) to obtain ($R_{condK1}$) and ($R_{condK2}$).

Figure 3:
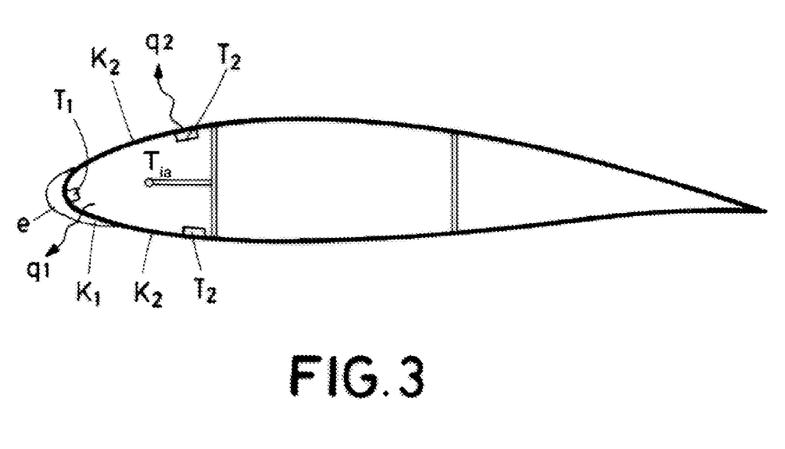
FIG. 3 shows a cross-sectional view of a wind turbine blade with the temperature sensors of the control station and the values used to calculate the thickness of the ice on the blade surface.

Internal convection resistance ($R_{convi}$). It is considered known (characterized based on a finite element calculation model, such as for example a CFD (computational fluid dynamics) model (considered to have identical value in points 1 and 2).

The following variables are calculated based on said parameters ad non the measured values of ($T_1$), ($T_2$) and ($T_{aia}$):

Calculation of the heat flows throughout the outer blade surface in points 1 and 2 (variables q1 and q2) based on the gradient between the air temperature in the interior of the blade and the temperature of the inner blade surface measured in said points 1 and 2 of the blade control station (($T_1-T_{ia}$) and ($T_2-T_{ia}$) respectively).

Calculation of external convection resistance ($R_{conve}$). This value is calculated based on the thermal gradient between the air temperature in the interior of the blade ($T_{ia}$) and the ambient temperature ($T_{ea}$), and the previously calculated value for (q2). It is assumed to be identical for both points of the blade profile in points 1 and 2 of the blade control station. Calculation of the thermal resistance of the ice on the leading edge based on the thermal gradient between the air temperature in the interior of the blade and the ambient temperature, and on the values calculated for (q1) and ($R_{conve}$).

Calculation of the temperature on the outer surface of the blade on the leading edge based on the foregoing values.

The calculation of ($R_{ice}$) is performed using the following formulas to calculate the two parameters dependent on the temperature conditions on the blade:

$$q1 = \frac{Tai - T2}{Rconvi} = \frac{Tai - Tae}{Rconvi + RcondK1 + Rhielo + Rconve}$$

$$q2 = \frac{Tai - T2}{Rconvi} = \frac{Tai - Tae}{Rconvi + RcondK2 + Rconve}$$

FIG. 3 represents a cross-section of a wind turbine blade to show the arrangement of the different sensors on said blade. It also shows the different parameters required to calculate the thickness of the ice layer. More specifically, ice layer thickness is calculated using the following formula:

$$e = Rice * Kice$$

wherein ($K_{ice}$) is the ice conductivity constant and ($R_{ice}$) is the thermal resistance of a blade wall given to ice formation (generally the leading edge of the blade).

Likewise, an object of the present invention is a method for removing ice from a wind turbine of the type comprising:
a rotor having at least two blades;
a wind turbine controller system; and
means for detecting the presence of ice on the blades;
a heating system having at least one heating element (31) connected to the control system and configured to carry out a heating stage of at least one of the blades,
said method comprising the following stages:
detection of the presence of ice on at least one of the blades;
and, upon detecting the presence of ice, it comprises activating at least one ice removal routine that comprises in turn the following stages:
a heating stage of at least one of the blades; and
a mechanical ice removal stage on at least said blade.

The heating stage comprises at least the activation of at least one heating element. The mechanical ice removal stage on at least said blade is preferably carried out after the heating stage.

Therefore, it has been determined that implementing an ice removal method which, firstly, heats at least one zone of the blade (3) to reduce the adherence of the ice mass to the blade (3) and, subsequently, carries out a mechanical ice removal stage on said blade, is particularly advantageous since it consumes less energy than heating until the ice melts and, in turn, is more effective than exclusively executing movements for mechanically removing the ice.

The ice removal method is destined to be implemented in a wind turbine of the type comprising a rotor having at least two blades, a control system, means for detecting the presence of ice on at least one of the blades (3) and a heating system having a heating element (31) connected to the control system and configured to carry out a heating stage of at least one of the blades.

The heating element (31) is a part of the heating system and can be any heating element (31) of those known in the state of the art and is preferably performed by means of an order given by the control system.

It is important that the heating of, at least, the critical zone of the blade (3) is maintained for a sufficient time required to thaw a part of the ice mass. The longer the time in which the heating is maintained, the less the adherence of the ice to the blade (3).

As regards the established time, this time may be previously determined and stored in the controller or, alternatively, taking into account the data obtained in stage a) and, depending on the amount of ice disposed on the blades (3), the time that the heater and/or the heat output to be applied must remain activated can be determined. In one embodiment, the heating stages of at least one of the blades and the mechanical ice removal stage on at least said blade are performed simultaneously, i.e. the heating system remains activated and a mechanical movement of the blade is induced at the same time. In another embodiment, the stage in which the movement of the blade is induced is carried out after the stage wherein the heating system is activated when said heating system has already been deactivated.

The mechanical ice removal stage on the blades can be executed by means of two types of orders sent by the control system:
wind turbine rotor rotation orders, which can in turn comprise rotor braking and acceleration orders, or
blade pitch angle adjustment orders by means of the actuation of the blade pitch adjustment system.

These orders can be selected from among:
Performing a blade movement adjusting the blade pitch angle by means of controlled acceleration and deceleration. Deceleration is high to simulate a quick blow that induces vibrations in the blade, thereby contributing to breaking up and/or detaching the ice.

Performing a wind turbine rotor starting sequence, such that the rotor starts rotating after the heating stage.

Performing a blade movement adjusting the blade pitch angle, said movement being, preferably, a reiterative movement of the pitch blade between pitch angles of 90° and 30°.

The present invention also proposes a method for controlling a wind turbine that comprises a rotor having at least two blades, a wind turbine control system and a heating system having at least one heating element connected to the control system and configured to carry out a heating stage of at least one of the blades. The method comprises a stage wherein the effectiveness heating system is estimated.

In one embodiment, the heating system continues active provided that the presence of ice is detected on the corresponding blade and the blade surface temperature in a zone with ice ($T_1$) is higher, for example, than −2° C., preferably higher than 0° C.

The presence of ice can be determined in the different manners described previously. When the presence of ice is detected in at least one of the wind turbine blades, the heating system effectiveness estimation stage comprises a substage for determining the thickness of the ice layer.

During the heating system effectiveness estimation stage, the activation of the heating system when the thickness of the ice layer is greater than a predetermined thickness is determined. Likewise, during the heating system effectiveness estimation stage, the deactivation of the heating system when the thickness of the ice layer is less than a predetermined thickness is determined.

In another embodiment, the activation of the heating system is determined when the ambient temperature and wind speed incident on the blade coincides with an ambient temperature and wind speed given to the formation of ice on the blade.

According to the method, the heating system effectiveness estimation stage includes carrying out the following substages:
  a stage wherein the wind speed and temperature conditions envisaged for the heating cycle are determined;
  a stage wherein the conditions envisaged for the heating system are compared with respect to wind speed and temperature conditions whereunder the heating system is effective.

If the heating system effectiveness estimation stage reveals that the heating system is effective for the purposes pursued, a heating system activation stage is carried out.

The heating system effectiveness estimation stage evaluates the possibility of removing or preventing ice in the wind turbine operating conditions to decide if the blade heating routine is activated or not. The activation of the heating system only occurs if the heating can be effective for preventing the formation of ice or removing it after its adhesion to the blade, in accordance with the purpose pursued.

The weather conditions whereunder the system is effective (for both modes, i.e. for de-icing and anti-icing) depend on whether or not the wind turbine is in operation, since if it is in operation the effectiveness of the heating system is reduced. For example, the weather conditions whereunder the system is effective are provided in table or graphic form or in any other form. The control algorithm includes a table or graph in its program for operation in de-icing or anti-icing mode.

The stage wherein the presence of ice or conditions given to the formation of ice on the blades is detected such that, if said conditions are detected, the stage wherein the effectiveness of the heating system is carried out.

Figure 4:
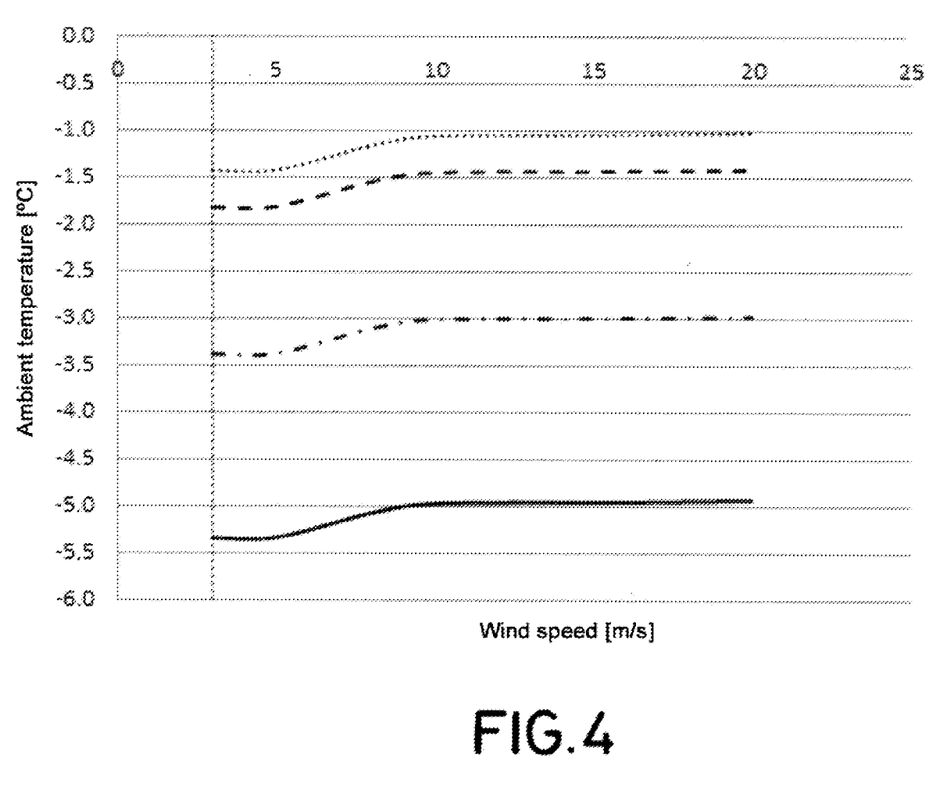
FIG. 4 shows a graph representing a table of results of the suitability of activating or not activating the heating system with the wind turbine in operation.

FIG. 4 shows different curves representing ambient temperature values in accordance with wind speed above which the heating system is effective when the wind turbine is in operation. As mentioned earlier, the speed and temperature conditions whereunder the system will be effective depend, to a certain extent, on the thickness of the ice layer. Thus, each of these curves corresponds to the wind speed and temperature conditions above which the heating system is effective for different conditions of ice deposited on the profile. Wind speed is represented on the x-axis and temperature is represented on the y-axis.

In order to operate the heating system in anti-icing mode, the stage wherein the effectiveness of the heating system is estimated according to the method includes carrying out the following stages:
  a stage wherein wind speed and temperature conditions whereunder the formation of ice can be prevented are determined; and
  a stage wherein the wind speed and temperature conditions envisaged for the heating cycle are compared with wind speed and temperature conditions whereunder the formation of ice can be prevented;
  a stage wherein the heating system is activated if the comparison between the speed and temperature conditions with respect to the wind speed and temperature conditions whereunder the formation of ice can be prevented results that the heating system is effective.

The first curve that can be observed in FIG. 4 (represented with a dotted line) is used to determine whether or not the system is effective as an anti-icing system when the wind turbine is in operation and there is no ice deposited on the profile but there are conditions given to ice formation.

The heating system is activated in de-icing mode when it has been detected that it would not be effective as an anti-icing system but the conditions given to ice formation continue and the presence of ice is finally detected. In this case, a stage wherein the effectiveness of the heating system for operation in de-icing mode (for ice removal) is estimated will be carried out.

Thus, the stage wherein the effectiveness of the heating system is estimated according to the method includes, for operation in de-icing mode, carrying out the following stages:
  a stage wherein the wind speed conditions and temperature in which the ice can be removed are determined;
  a stage wherein the wind speed and temperature conditions envisaged for the next instants are determined;
  a stage wherein the speed and temperature conditions are compared with respect to the wind speed and temperature conditions whereunder the ice can be removed;
  a stage wherein the heating system is activated if the comparison between the speed and temperature conditions with respect to the wind speed and temperature conditions whereunder it can be removed results that the heating system is effective.

The remaining curves of FIG. 4 correspond to the effectiveness of the heating system in de-icing mode when the wind turbine is in operation (with the rotor rotating). The different curves represent different ice conditions on the blade surface (the curves correspond to a minor amount, a moderate amount and a severe amount of ice, respectively represented by a dashed line, dash-dot line and continuous line). Once the amount of ice has been estimated, the most representative curve is selected and the weather conditions envisaged for the heating cycle with the conditions whereunder the system is effective are compared.

Alternatively, a single representative average curve for all cases of ice can be selected and this single curve can be used if ice is detected and there are no means to quantify the amount of ice.

Figure 5:
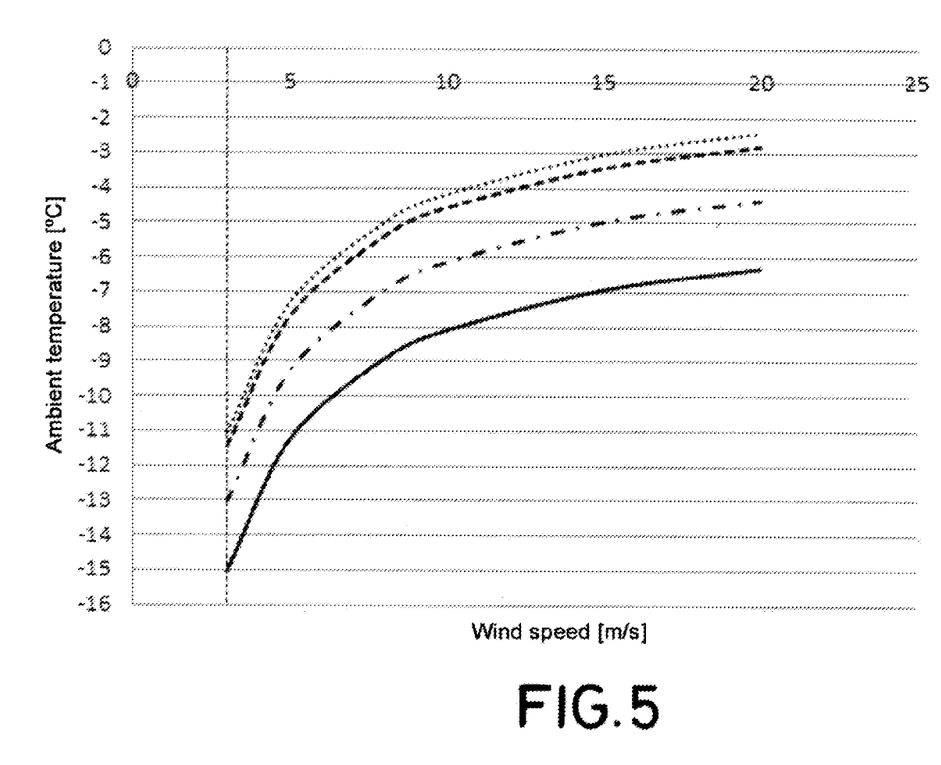
FIG. 5 shows a graph representing a table of results of the suitability of activating or not activating the heating system with the wind turbine stopped.

FIG. 5 shows the curves corresponding to the effectiveness of the heating system when the wind turbine is paused (the rotor stopped). The curves that correspond to conditions of non-presence of ice, minor presence of ice, moderate presence of ice and severe presence of ice have been represented, identified in the same manner as in the graph of FIG. 4.

The stage wherein the wind speed and temperature conditions envisaged for the heating cycle are determined (i.e. for the next instants wherein the heating cycle will potentially be executed), either for anti-icing or de-icing, comprises one of the following methods for obtaining said conditions:

- measuring the current wind speed and temperature conditions and assuming that the wind speed and temperature conditions in the next instants will be similar to the current conditions;
- measuring current wind speed and temperature, and estimating the wind speed and temperature values envisaged for the next instants based on the wind speed and temperature trends observed in previous instants (past hours, days, etc.);
- measuring the wind speed and temperature log of the previous instants and estimating the wind speed and temperature values envisaged for the next instants based thereupon; and
- receiving predictions on the wind speed and temperature envisaged for the next instants, for example, from a remote control center of the park or from a weather station.

As explained earlier, the speed and temperature conditions whereunder the system would be effective depend, to a certain extent, on the thickness of the ice layer. In this case, the wind turbine would comprise means for estimating the thickness or amount of ice deposited on the blades and the method includes:

- a stage wherein the thickness of the ice layer is quantified,
- a stage wherein the wind speed and temperature conditions whereunder the ice can be removed in accordance with thickness.

The heating system will be activated if the comparison between the speed and temperature conditions with respect to the wind speed and temperature conditions results that the heating system is effective.

As of a high threshold thickness of the ice layer (or power losses) and if the system is not capable of removing the ice with the wind turbine in operation, the wind turbine rotor is stopped to activate the heating system. Above this threshold, if the system is effective, the system is activated with the wind turbine in operation, i.e. with the rotor activated.

What is claimed is:

1. A wind turbine control method, the wind turbine comprising:
    a rotor having at least two blades;
    a wind turbine control system;
    a heating system having at least one heating element connected to the control system and configured to carry out a heating of at least one of the blades;
    wherein the method comprises:
    detecting the presence of ice or conditions given to formation of ice on the blades,
    after detecting the presence of ice or conditions given to formation of ice on the blades, carrying out a heating system effectiveness estimation stage which gives a result that the heating system is effective for preventing the formation of the ice in an anti-icing mode or for removing the ice in a de-icing mode of the wind turbine,
    carrying out a heating system activation stage after the heating system effectiveness estimation stage, and
    wherein the heating system is effective when wind speed and ambient temperature values currently measured are above one curve representing ambient temperature values in accordance with wind speed values predetermined as envisaged for preventing the formation of the ice in the anti-icing mode or for removing the ice in the de-icing mode of the wind turbine.

2. The wind turbine control method, according to claim 1, wherein the heating system effectiveness estimation stage includes carrying out the following substages:
    a stage wherein the wind speed and temperature conditions envisaged for the heating stage are determined;
    a stage wherein the wind speed and temperature conditions envisaged for the heating stage are compared with the wind speed and temperature conditions whereunder the heating system is effective.

3. The wind turbine control method, according to claim 1, wherein the heating system effectiveness estimation stage includes carrying out the following substages:
    a stage wherein wind speed and temperature conditions whereunder the heating system is effective are determined;
    a stage wherein wind speed and temperature conditions envisaged for the heating stage are determined;
    a comparing stage for comparing the wind speed and temperature conditions envisaged for the heating stage with respect to wind speed and temperature conditions whereunder the heating system is effective.

4. The wind turbine control method, according to claim 1, which comprises a stage for detecting the presence of ice or of conditions favorable to the presence of ice prior to the heating system effectiveness estimation stage.

5. The wind turbine control method, according to claim 1, which comprises a stage wherein a thickness of an ice layer is quantified and a stage wherein speed and temperature conditions whereunder the ice layer can be removed are determined considering the thickness of the ice layer.

6. A wind turbine control system, the wind turbine comprising:
    a rotor having at least two blades;
    a heating system having at least one heating element connected to the control system and configured to carry out a heating stage of at least one of the blades;
    wherein the system comprises:
    a heating system effectiveness estimator and,
    a heating system activator,
    wherein the effectiveness estimator of the heating system is configured to carry out a heating system effectiveness estimation stage, if the presence of ice or conditions given to formation of ice on the blades are detected,
    wherein the heating system activator is configured to be activated after the heating system effectiveness estimator only if the heating system effectiveness estimator gives as result that the heating system is effective for preventing the formation of ice in an anti-icing mode or for removing the ice in an de-icing mode of the wind turbine, wherein the heating system is effective when wind speed and ambient temperature values currently measured are above one curve representing ambient temperature values in accordance with wind speed values predetermined as envisaged for preventing the formation of ice in the anti-icing mode or for removing the ice in the de-icing mode of the wind turbine.

7. The wind turbine control system according to claim 6, wherein the heating system effectiveness estimator is configured to determine the wind speed and ambient temperature values envisaged for the heating system for preventing the formation of ice in the anti-icing mode or for removing the ice in the de-icing mode of the wind turbine and further to compare the wind speed and ambient temperature values measured with respect to the wind speed and ambient temperature values previously determined.

8. The wind turbine control system according to claim 6, which comprises an ice detector configured to detect the presence of ice or conditions favorable to the presence of ice.

9. The wind turbine control system according to claim 6, which comprises an ice detector configured to quantify a thickness of an ice layer.

10. A wind turbine comprising the wind turbine control system according to claim 6.

11. A wind turbine control method, the wind turbine comprising:

a rotor having at least two blades;
a wind turbine control system;
a heating system having at least one heating element connected to the control system and configured to carry out a heating of at least one of the blades; wherein the method comprises
a stage for detecting the presence of an ice layer on the at least two blades,
a stage wherein a thickness of the ice layer is quantified and a stage wherein speed and temperature conditions whereunder the ice layer can be removed are determined considering the thickness of the ice layer,
a heating system effectiveness estimation stage which gives a result that the heating system is effective for removing the ice in a de-icing mode of the wind turbine, and
a heating system activation stage carried out after the heating system effectiveness estimation stage, and
wherein the heating system is effective when wind speed and ambient temperature values currently measured are above one curve representing ambient temperature values in accordance with wind speed values predetermined as envisaged for removing the ice in the de-icing mode of the wind turbine.

* * * * *

UNITED STATES PATENT AND TRADEMARK OFFICE
CERTIFICATE OF CORRECTION

| | | |
|---|---|---|
| PATENT NO. | : 11,703,035 B2 | Page 1 of 1 |
| APPLICATION NO. | : 16/987935 | |
| DATED | : July 18, 2023 | |
| INVENTOR(S) | : Teresa Arlaban Gabeiras et al. | |

It is certified that error appears in the above-identified patent and that said Letters Patent is hereby corrected as shown below:

On the Title Page

Item (72), under inventors, delete "Carmen Azpillaga Alsaua" and insert --Carmen Azpilla Alsasua--.

Signed and Sealed this
Fourteenth Day of November, 2023

Katherine Kelly Vidal
*Director of the United States Patent and Trademark Office*